United States Patent
Nakano et al.

(10) Patent No.: US 6,802,030 B2
(45) Date of Patent: Oct. 5, 2004

(54) DATA TRANSFER METHOD

(75) Inventors: Daisuke Nakano, Tenri (JP); Yuji Ichikawa, Tenri (JP); Kiyoshi Miura, Isehara (JP)

(73) Assignees: Sharp Kabushiki Kaisha, Osaka (JP); Sony Corporation, Tokyo (JP)

( * ) Notice: Subject to any disclaimer, the term of this patent is extended or adjusted under 35 U.S.C. 154(b) by 603 days.

(21) Appl. No.: 09/838,224

(22) Filed: Apr. 20, 2001

(65) Prior Publication Data

US 2001/0044914 A1 Nov. 22, 2001

(30) Foreign Application Priority Data

Apr. 20, 2000 (JP) .................................. 2000-119228

(51) Int. Cl.[7] .............................................. G06F 11/00
(52) U.S. Cl. .................... 714/43; 714/704; 714/716; 398/17; 398/20
(58) Field of Search .......................... 398/17, 27, 25, 398/20, 21; 714/706, 704, 707, 708, 774, 43, 25, 716

(56) References Cited

U.S. PATENT DOCUMENTS

| | | | | |
|---|---|---|---|---|
| 5,367,395 A | * | 11/1994 | Yajima et al. | 398/17 |
| 5,513,185 A | * | 4/1996 | Schmidt | 714/708 |
| 5,764,651 A | * | 6/1998 | Bullock et al. | 714/708 |
| 5,778,003 A | * | 7/1998 | Puppa et al. | 714/716 |
| 5,835,500 A | * | 11/1998 | Schiller | 714/704 |
| 5,859,716 A | * | 1/1999 | O'Sullivan et al. | 398/17 |
| 5,905,585 A | * | 5/1999 | Shirai | 398/20 |
| 6,230,120 B1 | * | 5/2001 | Suvanen | 704/201 |
| 6,560,725 B1 | * | 5/2003 | Longwell et al. | 714/54 |
| 6,678,477 B1 | * | 1/2004 | Matsuda et al. | 398/136 |

FOREIGN PATENT DOCUMENTS

| | | |
|---|---|---|
| JP | A6350531 | 12/1994 |
| JP | 0762684 A2 | 3/1997 |
| JP | 2000-4260 A | 1/2000 |
| JP | 2000-092030 A | 3/2000 |

OTHER PUBLICATIONS

IEEE Std 1394–1995, IEEE Standard for a High Performance Serial Bus.
Nakano D et al., "Development of the Protocol for Optical Fiber Communications Compatible with IEEE1394," Sharp Technical Journal, Dec. 1998, pp. 12–17, vol. 75, Sharp Corporation, Nara–Ken, Japan.
Santamaria R, "IEEE–1394: A Standard for the Next Millenium," Digital Avionics Systems Conference, 1999. Proceedings. 18th, St. Louis, MO, USA, Oct. 24–29, 1999, Piscataway, NJ, USA, IEEE, US, Oct. 14, 1999, pp. 1.C.2–1–1.C.2–7.
Cross J et al., "A Single–Fiber Bidirectional Optical Link Using Colocated Emitters and Detectors," IEEE Photonics Technology Letters, IEEE Inc., New York, US, vol. 8, No. 10, Oct. 1, 1996, pp. 1385–1387.

* cited by examiner

Primary Examiner—Robert Beausoliel
Assistant Examiner—Marc M Duncan
(74) Attorney, Agent, or Firm—Birch, Stewart, Kolasch & Birch, LLP

(57) ABSTRACT

A data transfer method includes a connection establishment step of detecting connection with a remote device and setting parameters for data transfer, and a transfer execution step of starting data transfer after completion of the connection establishment step and continuing data transfer until a transfer error is recognized to have occurred. In the transfer execution step, the frequency of errors in received data is monitored and, when the frequency reaches a predetermined value, a transfer error is recognized to have occurred.

8 Claims, 8 Drawing Sheets

DATA TRANSFER METHOD

BACKGROUND OF THE INVENTION

1. Field of the Invention

The present invention relates to a data transfer method that allows bidirectional data transfer.

2. Description of the Prior Art

The IEEE 1394-1995 standard (hereinafter also abbreviated to "IEEE 1394"), which is a standard for a high-speed serial bus, was formulated to permit high-speed transfer of a large amount of data such as images among information processing devices such as computers and digital cameras. According to IEEE 1394, bidirectional data transfer is achieved across four electric signal wires (two twisted pairs of wires).

According to IEEE 1394, during data transfer, only the device that has obtained the right to transmit transmits data together with a strobe that is used by a receiving device to reproduce a clock. To arbitrate a conflict over the right to transmit data between two devices, the two devices each drive an arbitration signal on the twisted-pair wires simultaneously, and check what arbitration signal the conflicting device has driven by comparing the potential state of the arbitration signal they have themselves driven with that of the signal that has actually appeared on the twisted-pair wires.

On the other hand, according to p1394b, which has been under preparation as an expanded version of the IEEE 1394 standard, data transfer conforming to IEEE 1394 is conducted across two optical fibers. On optical fibers, data and a strobe cannot be transmitted as described above, and therefore, depending on the bit sequence transmitted, the receiving device may fail to reproduce a clock. To avoid this, data is transmitted after undergoing encoding whereby clock information is superimposed on the data itself. According to p1394b, an encoding method called 8B10B is used. Moreover, on optical fibers, it is impossible to perform arbitration by simultaneous driving of signals as performed in IEEE 1394. Instead, codes that do not appear after the encoding of data by the aforementioned encoding method are allocated for control codes, and arbitration is achieved through bidirectional exchange of control codes.

Moreover, according to p1394b, signals (hereinafter called "tone signals") that are different from those used in data transfer are exchanged to detect connection with a remote device, to set parameters such as the data transfer speed, and thus to establish connection between a local and a remote device (the connection establishment step). Upon establishment of connection between the local and remote devices, data transfer is started (the transfer execution step). Specifically, first, predetermined codes are exchanged with the remote device to establish character synchronization (the synchronization establishment step), and thereafter ordinary data transfer is conducted using control codes and data codes (the ordinary transfer step)

Moreover, according to p1394b, every device produces a binary signal (hereinafter called the "SD signal") that is kept active while the device is receiving a signal. When connection is lost (specifically, when the remote device is physically disconnected, or when the remote device becomes unable to transmit, for example, because it has been switched off), no signal is received from the remote device, and thus the SD signal becomes non-active. Hence, loss of connection can readily be detected on the basis of the SD signal. When a device detects loss of connection, it returns to the step of establishing connection using tone signals.

According to p1394b, as will be described later, each node is kept transmitting some signal all the time. The SD signal is produced, for example, by charging and discharging a capacitor with a received signal. Whereas the SD signal sways between its active and non-active states during reception of tone signals, it remains active during reception of data signals. Hence, a receiving device can readily detect a transmitting device having started data transmission.

Moreover, according to p1394b, when the local device receives a code that the remote device cannot transmit (hereinafter, such a code will be called an "illegal code") during ordinary data transfer, the local device recognizes that a transfer error has occurred and returns to the step of establishing character synchronization.

As described above, p1394b deals with optical bidirectional data transfer using two optical fibers. For cost reduction and space saving, there is also a move under way to realize data transfer conforming to IEEE 1394 across a single optical fiber.

In data transfer conforming to IEEE 1394, identical control codes may be transmitted repeatedly. Hence, as long as character synchronization is established, even if, for example, one character in such a row is received incorrectly, data transfer can often be continued without any problem.

However, when bidirectional data transfer is conducted across a single optical fiber, the rate of errors in received data is higher than when two optical fibers are used. For this reason, detecting transfer errors by detecting illegal codes as performed in p1394b results in unnecessarily many interruptions in data transfer, and thus leads to low data transfer efficiency.

Moreover, in bidirectional data transfer using a single optical fiber, a light emitting unit and a light sensing unit cannot be separated optically. Thus, the light sensing unit of the local device receives not only the light emitted from the light emitting unit of the remote device (hereinafter, this light is called the "remote-device light") but also the light emitted from its own light emitting unit toward the remote device but reflected back by the light propagation path or the like (hereinafter, this light is called the "stray light"). That is, the light that the light sensing unit of the local device actually receives contains the remote-device light and the stray light.

A light sensing unit has a light sensor, and converts the light received by the light sensor into a binary electric signal according to the intensity of the received light. Since different light propagation paths have different lengths, and the performance of the light sensor varies to a certain extent from one individual light sensor to another, and the level of the remote-device light varies from one individual device to another, the threshold level of the aforementioned binary electric signal is not fixed, but is varied according to the level of the received light in such a way that, as the light sensor continues receiving intense light, the threshold level becomes higher and, as the light sensor continues receiving weak light, the threshold level becomes lower.

As will be inferred from the description above, when the local device stops transmission (that is, when it stops emitting light), the threshold level in the light-sensing unit at the remote device's node drops. To avoid this, each node is kept transmitting some signal all the time. Moreover, for such signals are allocated codes that, even if transmitted repeatedly, do not cause either a rise or a drop in the threshold level in the light sensing unit at the remote device's node.

The stray light has a lower level than the remote-device light. Thus, during reception of the remote-device light, the threshold level remains higher than the level of the stray light, and therefore the stray light does not affect the reception of the remote-device light. However, when the remote-device light is absent (in other words, when connection is lost), the threshold level becomes lower until eventually the stray light is received. As a result, it sometimes occurs that, although connection is lost, the reception of the stray light makes the SD signal active. Thus, it is not always possible to detect loss of connection on the basis of the SD signal alone as performed in p1394b.

In the event of loss of connection during ordinary data transfer, it is necessary to return to the step of establishing connection using tone signals. On the other hand, in the event of a transfer error, in which case connection is retained, it is necessary simply to return to the step of establishing synchronization.

However, in bidirectional data transfer using a single optical fiber, bit displacement or the like may cause the stray light to be received as an illegal code, and thus there is the possibility that, although connection is lost, a transfer error is erroneously detected. When a device erroneously detects a transfer error in this way, it returns to the step of establishing synchronization, and then, as long as it continues receiving the stray light, it returns to the step of establishing synchronization repeatedly. This makes it impossible to resume ordinary data transfer.

To avoid this, in bidirectional data transfer using a single optical fiber, when a transfer error is detected, it is necessary, just as when loss of connection is detected, to return to the step of establishing connection using tone signals. However, completing this step takes a far longer time than completing the step of establishing synchronization, and thus it takes a very long time to recover from a transfer error to ordinary data transfer. In bus-based communication, trouble in one part of the bus affects other parts thereof, and therefore it is desirable that recovery from a transfer error to ordinary data transfer take as short a time as possible.

SUMMARY OF THE INVENTION

An object of the present invention is to provide a data transfer method that enhances data transfer efficiency in data transfer that suffers from a relatively high error rate but that instead tolerates errors to a certain extent.

Another object of the present invention is to provide a data transfer method that detects loss of connection more reliably in bidirectional data transfer using a single optical fiber.

Still another object of the present invention is to provide a data transfer method that ensures unfailing recovery to ordinary data transfer and that permits recovery from a transfer error to ordinary data transfer in a shorter time than ever in bidirectional data transfer using a single optical fiber.

To achieve the above objects, according to one aspect of the present invention, in a data transfer method including a connection establishment step of detecting connection with a remote device and setting parameters for data transfer, and a transfer execution step of starting data transfer after completion of the connection establishment step and continuing data transfer until a transfer error is recognized to have occurred, the frequency of errors in received data is monitored in the transfer execution step and, when the frequency reaches a predetermined value, a transfer error is recognized to have occurred. This method makes it possible to continue ordinary data transfer unless illegal codes are received frequently.

According to another aspect of the present invention, in a data transfer method that achieves bidirectional data transfer using a single optical fiber and that includes a connection establishment step of detecting connection with a remote device and setting parameters for data transfer, and a transfer execution step of starting data transfer after completion of the connection establishment step and continuing data transfer until a transfer error is recognized to have occurred, codes are allocated in such a way that the codes a local device can transmit include the codes the remote device cannot transmit, and, in the connection establishment step, a transfer error is recognized to have occurred when a code the remote device cannot transmit is received. This method makes it possible to distinguish whether the light currently being received is the remote-device light or the stray light on the basis of the codes received.

When this method is adopted, it is essential to determine beforehand between the local and remote devices what codes they each use. There are several ways to make this determination, but no specific way is mentioned in the present invention, which simply requires that the determination be made in the step of establishing connection with the remote device using tone signals.

According to still another aspect of the present invention, in a data transfer method including a connection establishment step of detecting connection with a remote device and setting parameters for data transfer, and a transfer execution step of starting data transfer after completion of the connection establishment step and continuing data transfer until a transfer error is recognized to have occurred, wherein the transfer execution step includes a synchronization establishment step of establishing character synchronization, and an ordinary transfer step of conducting ordinary data transfer after completion of the synchronization establishment step, when a transfer error is recognized to have occurred in the ordinary transfer step, execution proceeds to either the connection establishment step or the synchronization establishment step according to the time that has elapsed after the ordinary transfer step was started.

According to this method, when a transfer error is detected, execution may return to the step of establishing character synchronization. When a transfer error is erroneously detected although connection is lost, even if execution returns to the step of establishing character synchronization, it never occurs that execution is locked into this step never to return to the step of establishing connection with the remote device using tone signals.

According to a data transfer method embodying the present invention, ordinary data transfer is continued unless errors occur frequently in received data. This helps prevent unnecessarily frequent interruptions of data transfer and thereby enhance data transfer efficiency in data transfer, such as data transfer conforming to IEEE 1394 and using a single optical fiber, that suffers from a relatively high error rate but that instead tolerates errors to a certain extent.

Moreover, it is possible to distinguish whether the light being received is the remote-device light or the stray light on the basis of codes. This makes it possible to detect loss of connection more reliably than ever in bidirectional data transfer using a single optical fiber.

Moreover, when a transfer error is detected, it is possible to return to either the step of establishing connection using tone signals or the step of establishing character synchronization according to the time that has elapsed up to the moment. This ensures unfailing recovery to ordinary data transfer, and in addition permits recovery from a transfer error to ordinary data transfer in a shorter time than ever.

BRIEF DESCRIPTION OF THE DRAWINGS

This and other objects and features of the present invention will become clear from the following description, taken in conjunction with the preferred embodiments with reference to the accompanying drawings in which.

DESCRIPTION OF THE PREFERRED EMBODIMENTS

Figure 1:
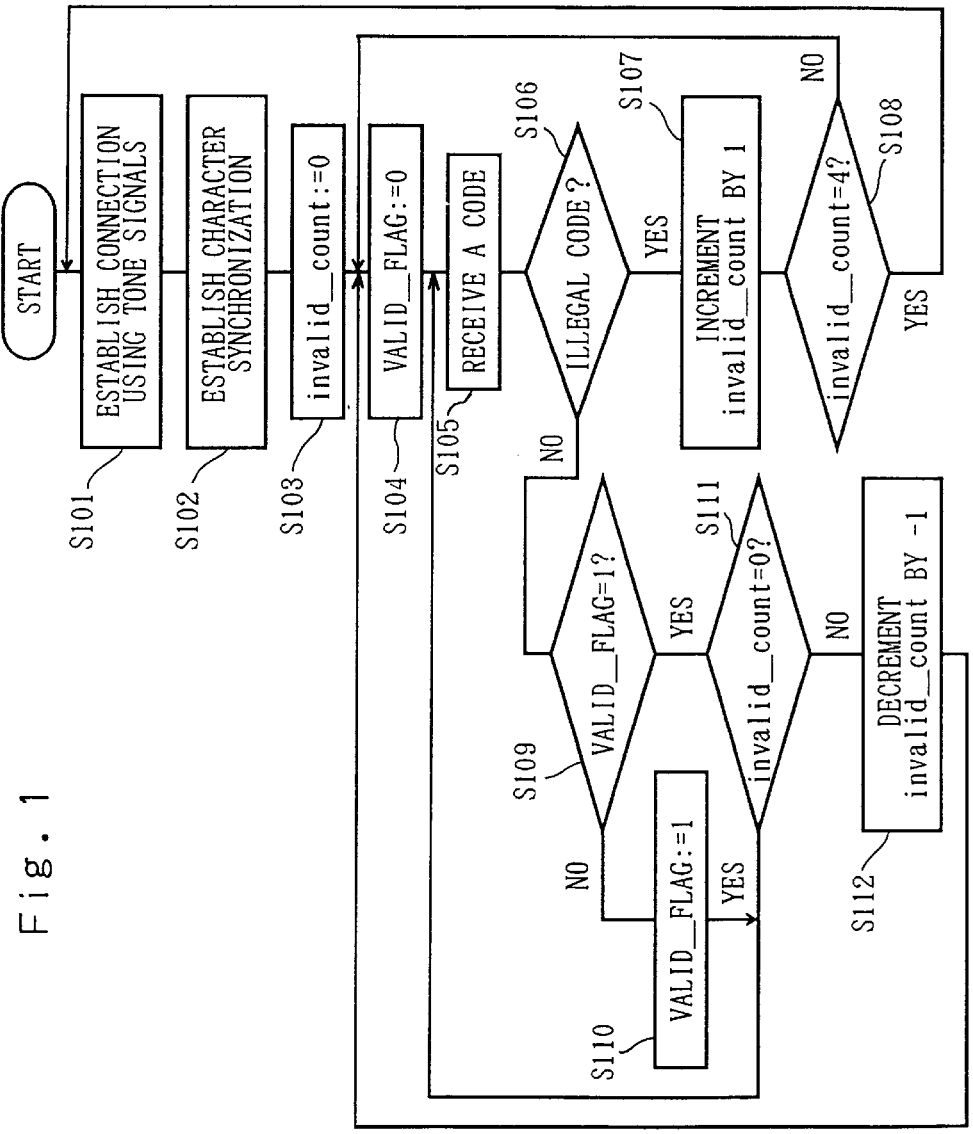
FIG. 1 is a flow chart of the data transfer procedure of a first embodiment of the invention.

Hereinafter, embodiments of the present invention will be described with reference to the drawings. The data transfer procedure used in the data transfer method of a first embodiment of the invention will be described below with reference to the flow chart shown in FIG. 1. First, connection is established using tone signals (S101). Next, character synchronization is established (S102). Next, a variable "invalid_count" is reset to zero (S103). Next, a variable "VALID_FLAG" is reset to zero (S104).

Next, a code is received (S105). Next, whether the code received in S105 is an illegal code or not is checked, and, if it is an illegal code (YES in S106), execution proceeds to S107 and, if it is not an illegal code (NO in S106), execution proceeds to S109.

In S107, the value of "invalid_count" is incremented by one. After S107, whether the value of "invalid_count" is four or not is checked (S108). If the value of "invalid_count" is four (YES in S108), a transfer error is recognized to have occurred, and execution proceeds to the step of establishing connection using tone signals (S101). On the other hand, if the value of "invalid_count" is not four (NO in S108), execution proceeds to S104, where the "VALID_FLAG" is reset to zero.

In S109, the value of "VALID_FLAG" is referred to, and, if the value of "VALID_FLAG" is not one (NO in S109), execution proceeds to S110 and, if the value of "VALID_FLAG" is one (YES in S109), execution proceeds to S111. In S110, the value of "VALID_FLAG" is set to one. After S110, execution proceeds to S105, where a code is received.

In S111, the value of "invalid_count" is referred to, and, if the value of "invalid_count" is zero (YES in S111), execution proceeds to S105, where a code is received, and, if the value of "invalid_count" is not zero (NO in S111), the value of "invalid_count" is decremented by one (S112). After S112, execution proceeds to S104, where "VALID_FLAG" is reset to zero.

In the step of establishing character synchronization (S102) also, the same operations are performed as are performed in S103 to S112 after the establishment of character synchronization in order to make it possible to proceed to the step of establishing connection using tone signals (S101) when a transfer error is recognized to have occurred.

Through the procedure described above, the value of "invalid_count" is incremented by one every time an illegal code is received and is decremented by one every time two legal codes (i.e. codes that the remote device can transmit) are received consecutively. When the value of "invalid_count" becomes equal to four, a transfer error is recognized to have occurred. That is, the frequency of errors in the received data is monitored and, when the frequency of errors in the received data is excessively high, a transfer error is recognized to have occurred.

As a result, according to the data transfer method of the first embodiment, ordinary data transfer is continued unless errors occur in the received data frequently (more correctly, unless illegal codes are received frequently). This helps prevent unnecessarily frequent interruptions of data transfer and thereby enhance data transfer efficiency in data transfer, such as data transfer conforming to IEEE 1394 and using a single optical fiber, that suffers from a relatively high error rate but that instead tolerates errors to a certain extent.

The data transfer method of a second embodiment of the invention relates to data transfer conforming to IEEE 1394 and using a single optical fiber. In the second embodiment, when connection is established between two devices using tone signals, one of the devices thus connected together is designated as primary and the other as secondary. Then, codes are allocated to the two devices in such a way that the IDLE codes that they transmit during reception or when they have no code to transmit differ depending on whether they are designated as primary or secondary and that those IDLE codes differ from any code that may be transmitted during ordinary data transfer.

The codes allocated in the second embodiment are listed in Table 1. The IDLE code "P_IDLE" of the node designated as primary and the IDLE code "S_IDLE" of the node designated as secondary are both assigned a pattern that does not coincide with any of the other control codes or the data codes encoded by the 8B10B method even if bit displacement occurs during continuous data transmission. Conversely, the other control codes and the data codes encoded by the 8B10B method are assigned patterns that do not coincide with "P_IDLE" or "S_IDLE" even if bit displacement occurs during continuous data transmission.

Figure 2:
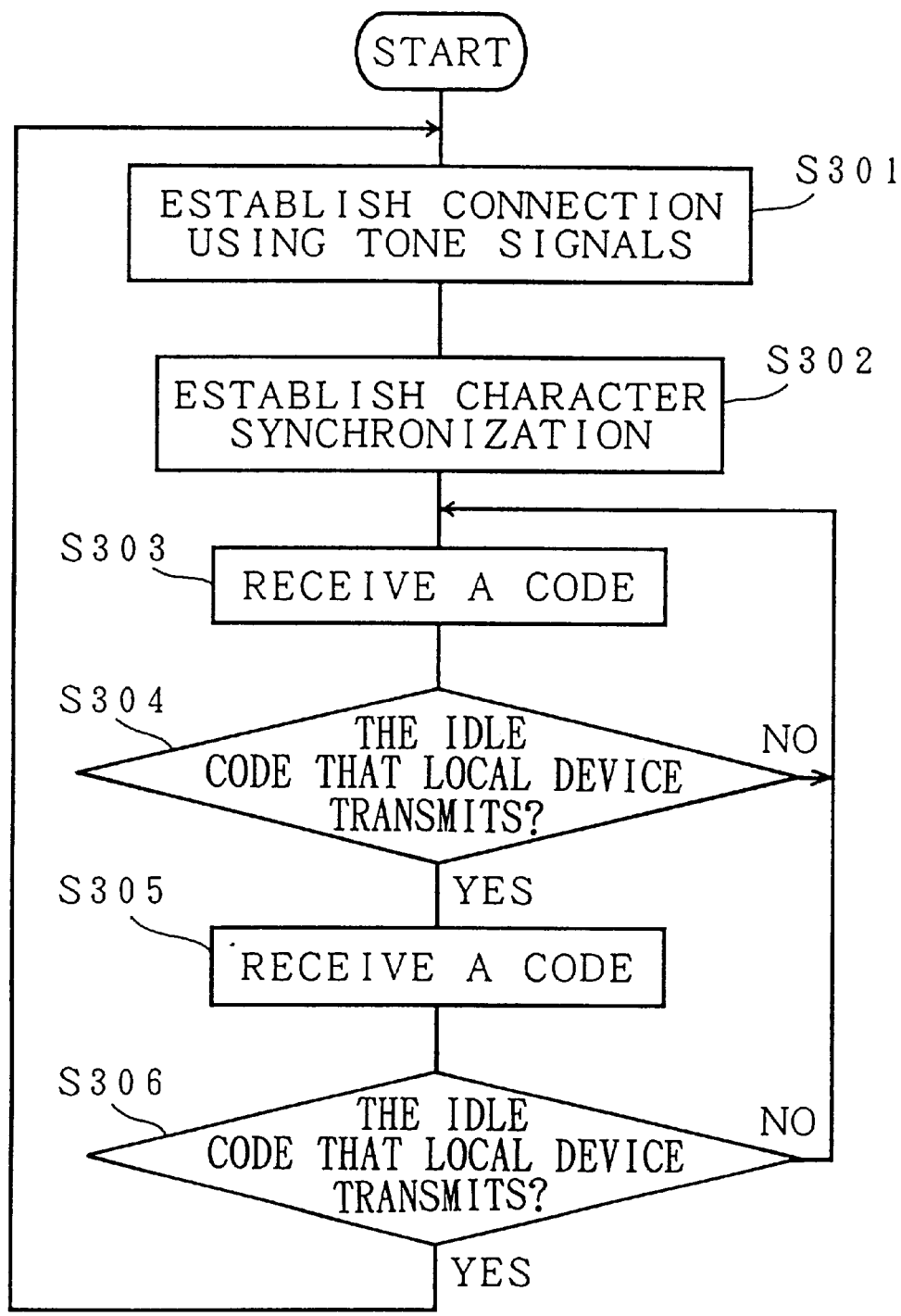
FIG. 2 is a flow chart of the data transfer procedure of a second embodiment of the invention.

The data transfer procedure used in the second embodiment will be described below with reference to the flow chart shown in FIG. 2. First, connection is established using tone signals (S301). Next, character synchronization is established (S302). Next, one character representing a code is received (S303). Next, if the code received in S303 is the IDLE code that the local device transmits (YES in S304), execution proceeds to S305 and, if that code is not the IDLE code that the local device transmits (NO in S304), execution proceeds to S303.

In S305, one character representing a code is received. After S305, if the code received in S305 is the IDLE code that the local device transmits (YES in S306), connection is recognized to have been lost, and execution proceeds to the step of establishing connection using tone signals (S301). On the other hand, if that code is not the IDLE code that the local device transmits (NO in S306), execution proceeds to S303.

In the step of establishing character synchronization (S302) also, the same operations are performed as are performed in S303 to S306 after the establishment of character synchronization in order to make it possible to proceed to the step of establishing connection using tone signals (S301) when connection is recognized to have been lost.

Figure 3:
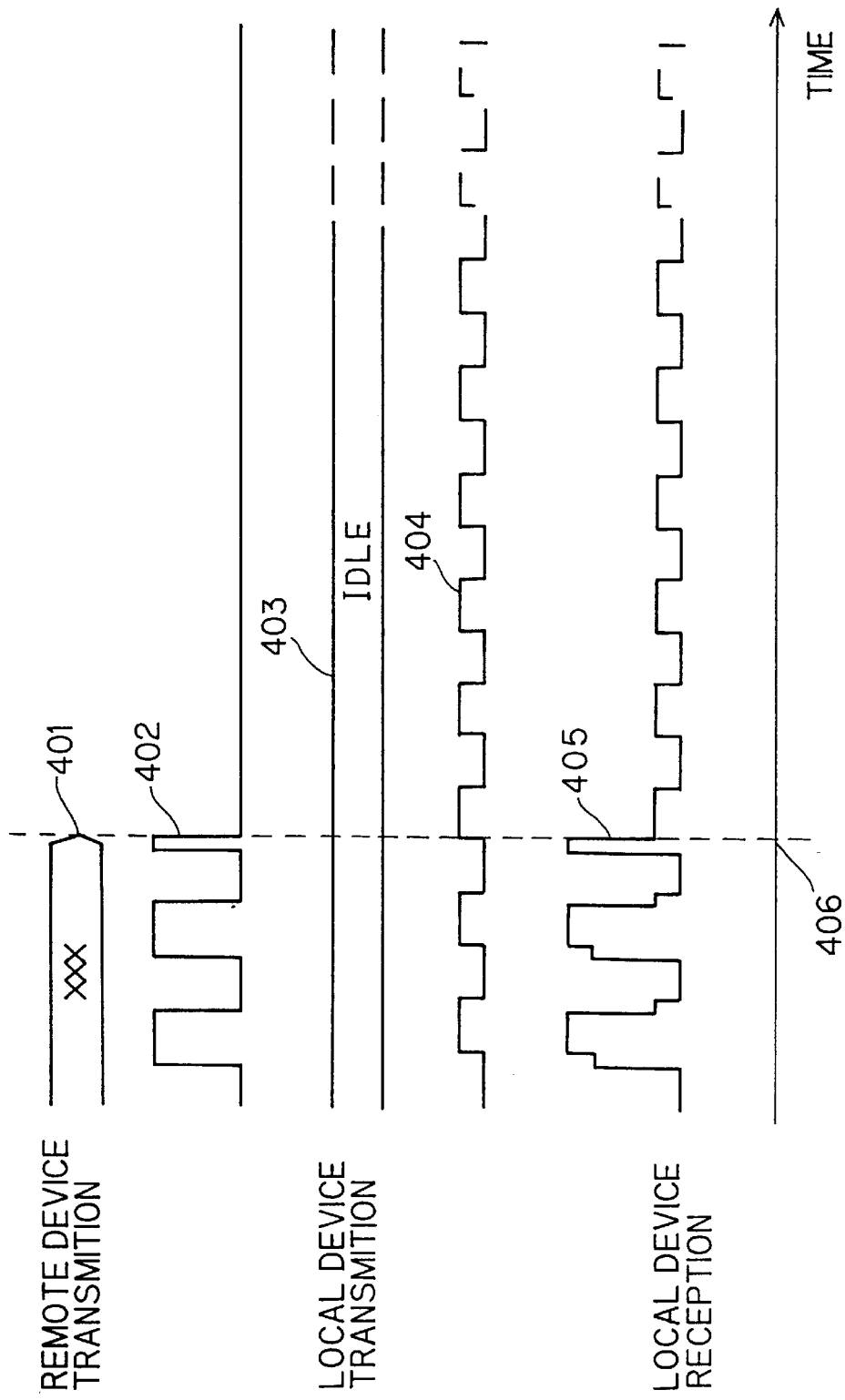
FIG. 3 is a timing chart of the relevant signals observed when the remote device stops transmitting a signal.

FIG. 3 is a timing chart of the relevant signals observed when the remote device stops transmitting a signal. Reference numeral 401 indicates the signal transmitted from the remote device, which stops transmitting it at a time point 406. Reference numeral 402 indicates the signal transmitted from the remote device as represented in terms of the level of light intensity. Here, for simplicity's sake, the signal is illustrated as having a pattern consisting of alternating 1's and 0's, but this does not necessarily mean that the remote device transmits a code having a pattern consisting of alternating 1's and 0's.

Reference numeral 403 indicates the signal transmitted from the local device, which transmits the IDLE code repeatedly. Reference numeral 404 indicates the signal transmitted from the local device as represented in terms of the level of light intensity. Here, for simplicity's sake, the signal is illustrated as having a pattern consisting of alternating 1's and 0's, but this does not necessarily mean that the local device transmits a code having a pattern consisting of alternating 1's and 0's.

Reference numeral 405 indicates the signal received by the local device as represented in terms of the level of light intensity. This signal is a superimposed mixture of the light transmitted from the remote device (the remote-device light) and the light transmitted from the local device but reflected back on the way (the stray light). Up till the time point 406, the remote-device light keeps sufficiently high the threshold level that is used to convert the received light into a binary electric signal. Since the level of the stray light is sufficiently low as compared with that of the remote-device light, only the remote-device light is received, and the stray light not. On the other hand, after the time point 406, the remote-device light is absent. This causes the threshold level to become lower until, after some point, the stray light starts being received.

When the stray light starts being received in this way, as long as no error occurs, unless bit displacement occurs, the IDLE codes transmitted from the local device are received. Thus, through the procedure shown in FIG. 2, at the time point that two IDLE codes transmitted from the local device have been received, connection is recognized to have been lost.

When the stray light starts being received as described above, as long as no error occurs, even if bit displacement occurs, the stray light is received as illegal codes. Thus, for example, by using together the method of the first embodiment described previously, it is possible to recognize a transfer error and continue the procedure.

Moreover, even when connection is lost while a code other than the IDLE code is being transmitted, according to the IEEE 1394 protocol, the IDLE code will surely be transmitted sometime unless loss of connection is detected, and thus it is possible to detect loss of connection.

The codes may be allocated in such a way that the codes other than the IDLE code have patterns that the remote device cannot transmit. However, on the grounds described above, to detect loss of connection more reliably, it is preferable to allocate the codes in such a way that the IDLE code has a pattern that the remote device cannot transmit.

In summary, according to the second embodiment, it is possible to distinguish whether the light being received is the remote-device light or the stray light on the basis of codes. This makes it possible to detect loss of connection more reliably than ever in bidirectional data transfer using a single optical fiber.

Figure 4:
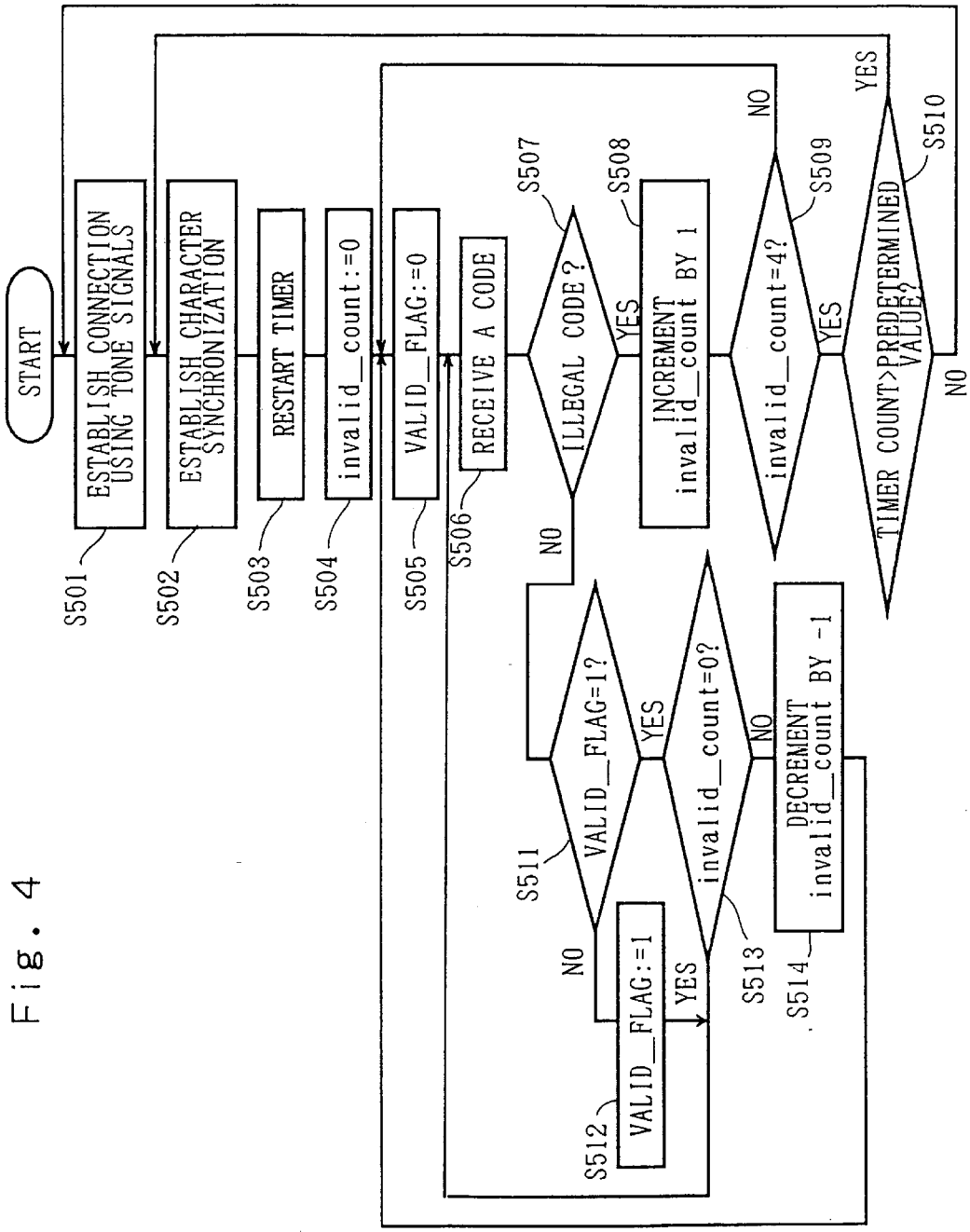
FIG. 4 is a flow chart of the data transfer procedure of a third embodiment of the invention.

The data transfer method of a third embodiment of the invention relates to data transfer conforming to IEEE 1394 and using a single optical fiber. The data transfer procedure used in the third embodiment will be described below with reference to the flow chart shown in FIG. 4. First, connection is established using tone signals (S501). Next, character synchronization is established (S502). Next, a timer is restarted (S503), Next, a variable "invalid_count" is reset to zero (S504). Next, a variable "VALID_FLAG" is reset to zero (S505).

Next, a code is received (S506). Next, whether the code received in S506 is illegal or not is checked, and, if it is an illegal code (YES in S507), execution proceeds to S508 and, if it is not an illegal code (NO in S507), execution proceeds to S511.

In S508, the value of "invalid_count" is incremented by one. After S508, whether the value of "invalid_count" is four or not is checked (S509). If the value of "invalid_count" is not four (NO in S509), execution proceeds to S505, where "VALID_FLAG" is reset to zero.

On the other hand, if the value of "invalid_count" is four (YES in S509), a transfer error is recognized to have occurred, and, if the count value of the timer is greater than a predetermined value (YES in S510), execution proceeds to the step of establishing character synchronization (S502) and, if the count value of the timer is not greater than the predetermined value (NO in S510), execution proceeds to the step of establishing connection using tone signals (S501).

In S511, the value of "VALID_FLAG" is referred to, and, if the value of the VALID_FLAG is not one (NO in S511), execution proceeds to S512 and, if the value of the VALID_FLAG is one (YES in S511), execution proceeds to S513. In S512, the value of the "VALID_FLAG" is set to one. After S512, execution proceeds to S506, where a code is received.

In S513, the value of "invalid_count" is referred to, and, if the value of "invalid_count" is zero (YES in S513), execution proceeds to S506, where a code is received and, if the value of "invalid_count" is not zero (NO in S513), the value of "invalid_count" is decremented by one (S514). After S514, execution proceeds to S505, where "VALID_FLAG" is reset to zero.

In the step of establishing character synchronization (S502) also, the same operations are performed as are performed after the establishment of character synchronization in order to make it possible to recognize the occurrence of a transfer error. The only difference is that, when a transfer error is recognized to have occurred in the step of establishing character synchronization (S502), execution proceeds to the step of establishing connection using tone signals (S501).

Figure 5:
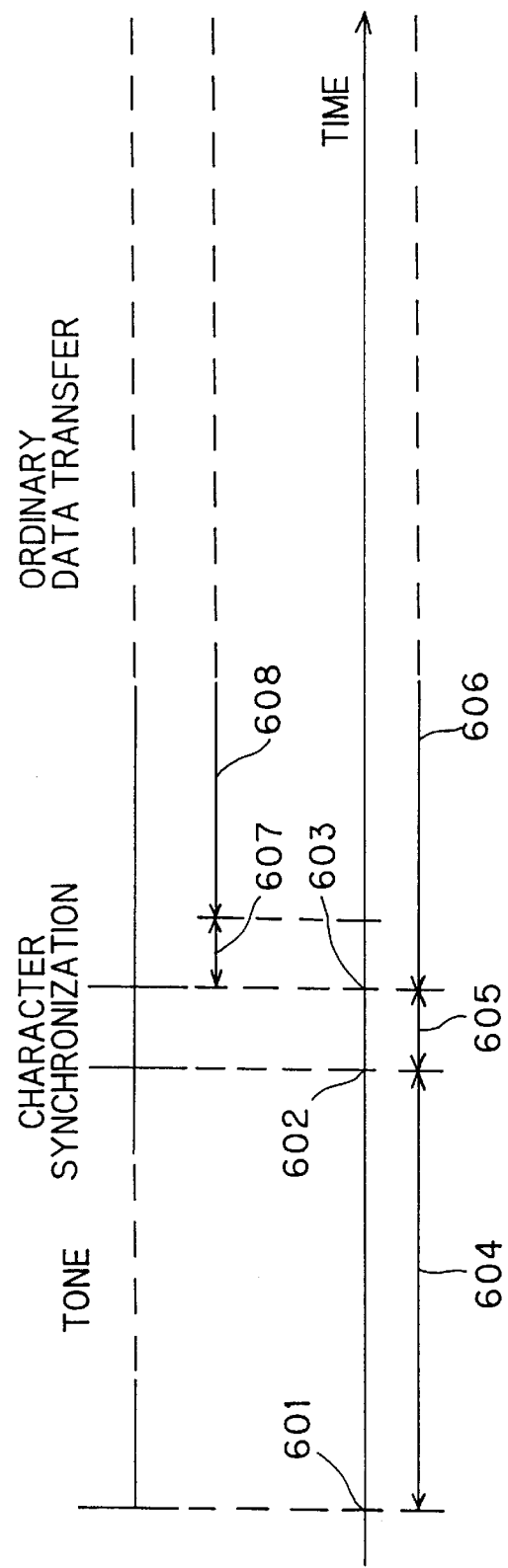
FIG. 5 is a diagram illustrating the relationship between the time zone in which a transfer error is detected and the step to which execution proceeds in the third embodiment.

Through the procedure described above, after the establishment of character synchronization, if illegal codes are received frequently and thus a transfer error is recognized to have occurred, execution proceeds to either the step of establishing connection using tone signals or the step of establishing character synchronization according to the time that has elapsed after the step of ordinary data transfer was started. The relationship between the time point at which a transfer error is detected and the step to which execution proceeds will be described below with reference to FIG. 5.

Reference numeral 601 indicates the time point at which tone signals start being transmitted to establish connection with the remote device when the local device has just been started up or has detected loss of connection. Reference numeral 602 indicates the time point at which predetermined codes start being transmitted to establish character synchronization after the establishment of connection with the remote device. Reference numeral 603 indicates the time point at which ordinary data transfer is started after the establishment of character synchronization.

The time 604 required by the step of establishing connection using tone signals is about 400 ms. On the other hand, the time 605 required by the step of establishing character synchronization is about 160 μs. Thus, the step of establishing connection using tone signals takes a far longer time than the step of establishing character synchronization.

In the third embodiment under discussion, in the period 606 in which ordinary data transfer is being conducted, if a transfer error is detected within the period 607 until a predetermined time has elapsed after the start of the ordinary data transfer, execution returns to the step of establishing connection using tone signals and, if a transfer error is detected in the other period 608 than the period 607, execution returns to the step of establishing character synchronization. The period 607 is set to have an appropriate length of time longer than the time required to detect a transfer error; specifically, about 125 μs suffices, which is far shorter than the time required by the step of establishing connection using tone signals.

Figure 6:
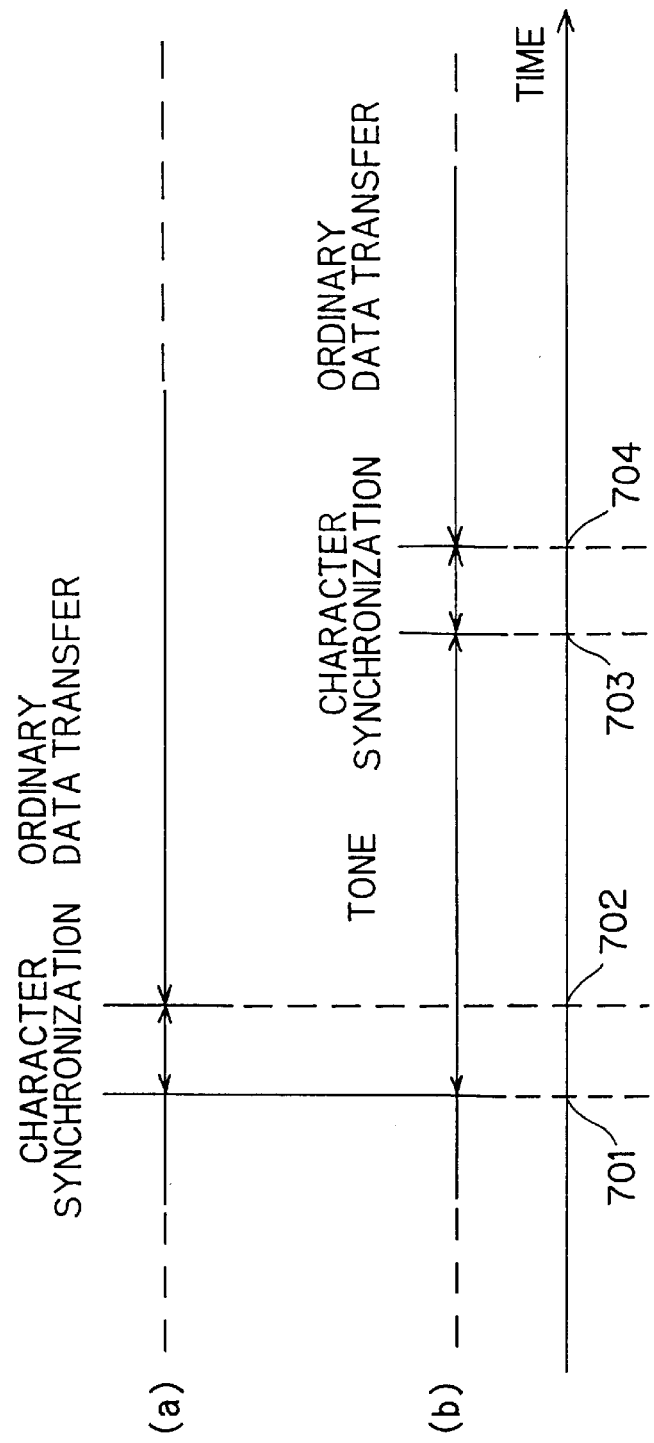
FIG. 6 is a diagram showing an example of step transition that takes place when a transfer error occurs in the third embodiment in comparison with step transition that takes place in a conventional method.

Thus, as shown at (a) in FIG. 6, when a genuine transfer error (i.e. not a transfer error that is detected as a result of the stray light being received as an illegal code when connection is lost, but a transfer error resulting from the reception of an illegal code that occurs when synchronism is lost, for example, as a result of a bit dropout) is detected at a time point 701 within the period 608, execution immediately proceeds to the step of establishing character synchronization, and thereafter, at the time point 702 at which this step is completed, ordinary data transfer is resumed. As a result, here, the time required from the detection of a genuine transfer error to the resumption of ordinary data transfer involves only the time required to establish character synchronization.

By contrast, conventionally, as shown at (b) in FIG. 6, at the time point at which a transfer error is detected, execution always returns to the step of establishing connection using tone signals. Thereafter, at the time point 703 at which connection is established, execution proceeds to the step of establishing character synchronization, and then, at the time point 704 at which character synchronization is established, ordinary data transfer is resumed. Thus, conventionally, the time required from the detection of a genuine transfer error to the resumption of ordinary data transfer involves both the time required to establish connection using tone signals and the time required to establish character synchronization, and is therefore far longer than in the third embodiment.

Figure 7:
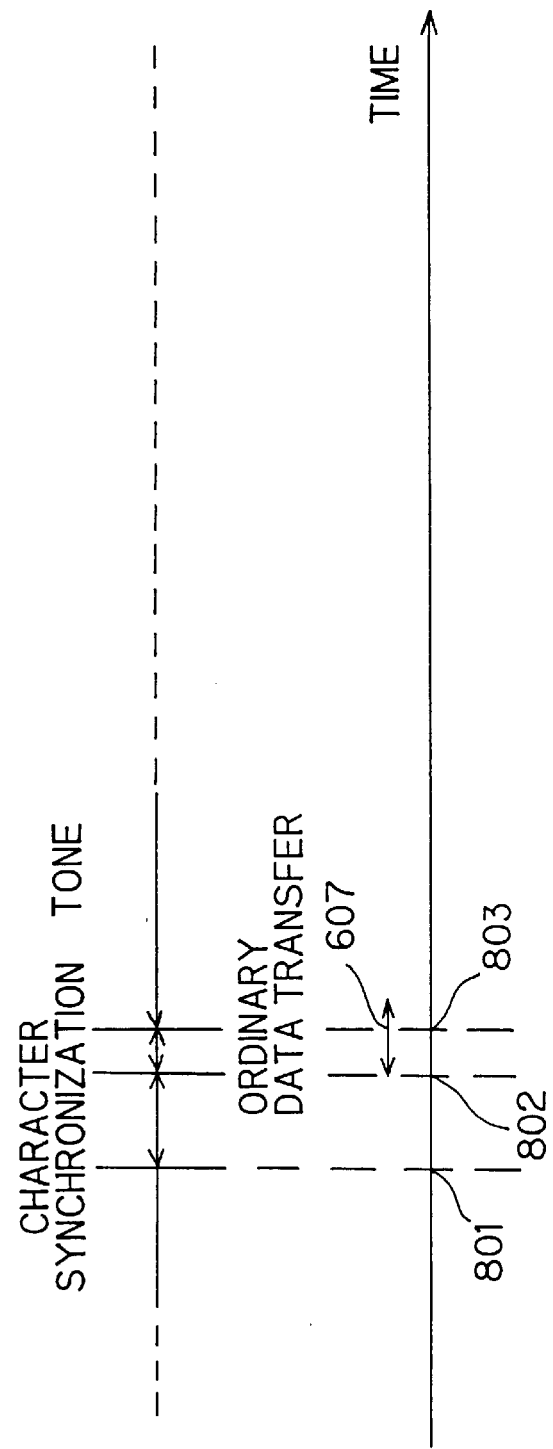
FIG. 7 is a diagram showing an example of step transition that takes place when connection is lost in the third embodiment.

On the other hand, when a transfer error is erroneously detected, i.e. when a transfer error is detected as a result of the stray light being received as an illegal code although, in reality, connection is lost, as long as the transfer error is recognized within the period 607, execution returns to the step of establishing connection using tone signals without any problem. When such a transfer error is recognized in the period 608, as shown in FIG. 7, at the time point 801 at which the transfer error is detected, execution proceeds to the step of establishing character synchronization, and then, at the time point 802 at which this step is completed, execution proceeds to the step of conducting ordinary data transfer. However, in this case, where connection is lost, a transfer error is detected again at a time point 803 within the aforementioned period 607, and thus, at this time point 803, execution proceeds to the step of establishing connection using tone signals. As a result, even when execution returns to the step of establishing character synchronization upon erroneous detection of a transfer error, it never occurs that execution is locked into this step. This ensures unfailing recovery to ordinary data transfer.

The data transfer method of a fourth embodiment of the invention relates to data transfer conforming to IEEE 1394 and using a single optical fiber. In the fourth embodiment, codes are allocated in the same manner as in the second embodiment.

Figure 8:
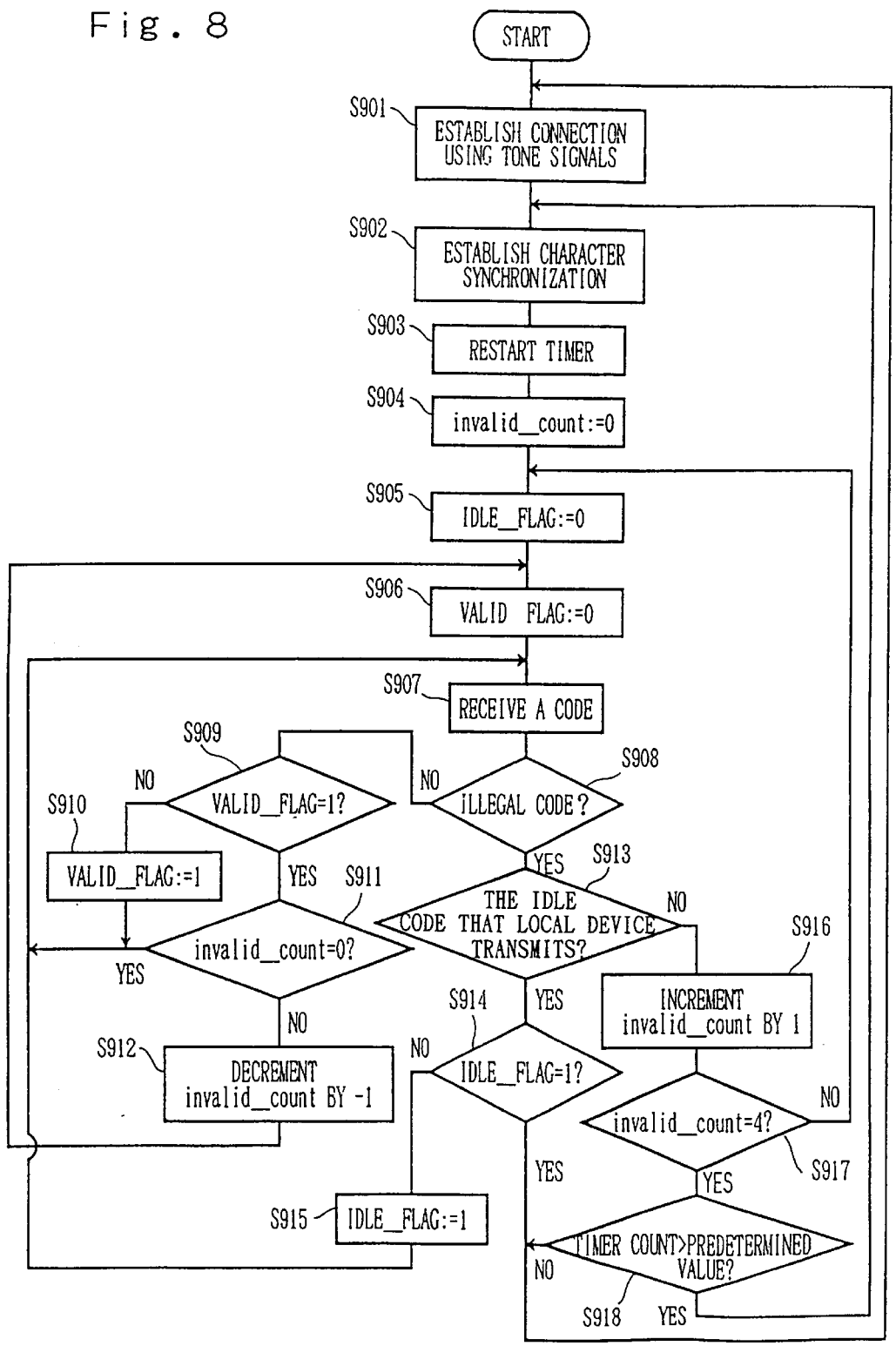
FIG. 8 is a flow chart of the data transfer procedure of a fourth embodiment of the invention.

The data transfer procedure used in the fourth embodiment will be described below with reference to the flow chart shown in FIG. 8. First, connection is established using tone signals (S901). Next, character synchronization is established (S902). Next, a timer is restarted (S903). Next, a variable "invalid_count" is reset to zero (S904). Next, a variable "IDLE_FLAG" is reset to zero (S905). Next, a variable "VALID_FLAG" is reset to zero (S906).

Next, a code is received (S907). Next, whether the code received in S907 is an illegal code or not is checked, and, if it is not an illegal code (NO in S908), execution proceeds to S909 and, if it is an illegal code (YES in S908), execution proceeds to S913.

In S909, the value of "VALID_FLAG" is referred to, and, if the value of "VALID_FLAG" is not one (NO in S909), execution proceeds to S910 and, if the value of "VALID_FLAG" is one (YES in S909), execution proceeds to S911. In S910, the value of "VALID_FLAG" is set to one. After S910, execution proceeds to S907, where a code is received.

In S911, the value of "invalid_count" is referred to, and, if the value of "invalid_count" is zero (YES in S911), execution proceeds to S907, where a code is received, and, if the value of "invalid_count" is not zero (NO in S911), the value of "invalid_count" is decremented by one (S912). After S912, execution proceeds to S906, where "VALID_FLAG" is reset to zero.

In S913, whether the code received in S907 is the IDLE code of the local device itself or not is checked, and, if it is the IDLE code of the local device (YES in S913), execution proceeds to S914 and, if it is not the IDLE code of the local device (NO in S913), execution proceeds to S916.

In S914, the value of "IDLE_FLAG" is referred to, and, if the value of "IDLE_FLAG" is one (YES in S914), connection is recognized to have been lost, and thus execution proceeds to the step of establishing connection using tone signals (S901). On the other hand, if the value of "IDLE_FLAG" is not one (NO in S914), the value of "IDLE_FLAG" is set to one (S915). After S915, execution proceeds to S907, where a code is received.

In S916, the value of "invalid_count" is incremented by one. After S916, whether the value of "invalid_count" is four or not is checked (S917). If the value of "invalid_count" is not four (NO in S917), execution proceeds to S905.

On the other hand, if the value of "invalid_count" is four (YES in S917), a transfer error is recognized to have occurred, and, if the count value of the timer is greater than a predetermined value (YES in S918), execution proceeds to the step of establishing character synchronization (S902) and, if the count value of the timer is not greater than the predetermined value (NO in S918), execution proceeds to the step of establishing connection using tone signals (S901).

In the step of establishing character synchronization (S902) also, the same operations are performed as are performed after the establishment of character synchronization in order to make it possible to recognize the occurrence of a transfer error resulting from frequent reception of illegal codes. The only difference is that, when a transfer error is recognized to have occurred in the step of establishing character synchronization (S902), execution proceeds to the step of establishing connection using tone signals (S901).

Through the procedure described above, after the establishment of character synchronization, when illegal codes other than the IDLE code of the local device itself are received frequently, a transfer error is recognized to have occurred, and, when a transfer error is detected in this way, whether to return to the step of establishing connection using tone signals or the step of establishing character synchronization is determined according to the time that has elapsed up to the moment. When two IDLE codes of the local device itself are received consecutively, connection is recognized to have been lost, and, when loss of connection is detected in this way, execution always returns to the step of establishing connection using tone signals. This is effective in eliminating the ineffective operation of returning to the step of establishing character synchronization that is performed when connection is lost in the period 608 shown in FIG. 5 in the third embodiment described previously.

In the third and fourth embodiments described above, when a transfer error is detected, whether to return to the step of establishing connection using tone signals or the step of establishing character synchronization is determined according to the time that has elapsed up to the moment. However, it is also possible, instead, to return always to the step of establishing character synchronization whenever a transfer error is detected and return to the step of establishing connection using tone signals only when character synchronization is not established within a predetermined time after the detection of the transfer error. This also helps reduce the time required from the occurrence of a transfer error to the resumption of ordinary data transfer.

TABLE 1

| Arbitration Symbol | | Character | |
|---|---|---|---|
| | | rd < 0 | rd > 0 |
| QUIET | | | 000000 0000 |
| PREAMBLE | D10.2 | | 010101 0101 |
| P_IDLE<br>S_TPBIAS_DISABLE | K.28.5 | 001111 1010 | 110000 0101 |
| S_IDLE<br>P_TPBIAS_DISABLE | K.28.1 | 001111 1001 | 110000 0110 |
| REQUEST | K.28.6 | 001111 0110 | 110000 1001 |
| GRANT | | | |
| PARENT_NOTIFY | K.30.7 | 011110 1000 | 100001 0111 |
| DATA_PREFIX | K.27.7 | 110110 1000 | 001001 0111 |
| CHILD_NOTIFY<br>IDENT_DONE | K.29.7 | 101110 1000 | 010001 0111 |
| DATA_END | K.23.7 | 111010 1000 | 000101 0111 |
| SPEED200<br>NEXT_SPEED | K.28.2 | 001111 0101 | 110000 1010 |
| SPEED400<br>END_SPEED | K.28.3 | 001111 0011 | 110000 1100 |
| BUS_RESET<br>SYNC_CHARACTER | K.28.7 | 001111 1000 | |
| SUSPEND | K.28.0 | 001111 0100 | 110000 1011 |
| DISABLE_NOTIFY | K.28.4 | 001111 0010 | 110000 1101 |

What is claimed is:

1. A data transfer method comprising:

a connection establishment step of detecting connection with a remote device and setting parameters for data transfer; and a transfer execution step of starting data transfer after completion of the connection establishment step and continuing data transfer until a transfer error is recognized to have occurred, wherein, in the transfer execution step, frequency of errors in received data is monitored and, when the frequency reaches a predetermined value, a transfer error is recognized to have occurred, and wherein the frequency of errors in received data is monitored with a counter that increments a count when a code the remote device cannot transmit is received and that decrements the count when a code the remote device can transmit is received.

2. A data transfer method as claimed in claim 1, wherein a transfer error is recognized to have occurred when a count becomes four in a counter that increments the count by one every time a code the remote device cannot transmit is received and that decrements the count by one every time two codes the remote device can transmit are received consecutively.

3. A data transfer method that achieves bidirectional data transfer using a single optical fiber, the data transfer method comprising:

a connection establishment step of detecting connection with a remote device and setting parameters for data transfer; and a transfer execution step of starting data transfer after completion of the connection establishment step and continuing data transfer until a transfer error is recognized to have occurred, wherein codes are allocated in such a way that codes a local device can transmit include codes the remote device cannot transmit, and, in the connection establishment step, a transfer error is recognized to have occurred when a code the remote device cannot transmit is received, wherein data transfer is conducted in conformity with an IEEE 1394-1995 standard, and codes are allocated in such a way that an IDLE code of the local device is different from an IDLE code of the remote device and that the IDLE codes of those devices are different from other codes those devices can transmit.

4. A data transfer method that achieves bidirectional data transfer using a single optical fiber, the data transfer method comprising:

a connection establishment step of detecting connection with a remote device and setting parameters for data transfer; and a transfer execution step of starting data transfer after completion of the connection establishment step and continuing data transfer until a transfer error is recognized to have occurred, wherein codes are allocated in such a way that codes a local device can transmit include codes the remote device cannot transmit, and, in the connection establishment step, a transfer error is recognized to have occurred when a code the remote device cannot transmit is received, and wherein the transfer execution step comprises a synchronization establishment step of establishing character synchronization, and an ordinary transfer step of conducting ordinary data transfer after completion of the synchronization establishment step, and, when a transfer error is recognized to have occurred in the ordinary transfer step, execution proceeds to either the connection establishment step or the synchronization establishment step according to a time that has elapsed after the ordinary transfer step was started.

5. A data transfer method as claimed in claim 4, wherein, when connection is recognized to have been lost, execution proceeds to the connection establishment step.

6. A data transfer method comprising a connection establishment step of detecting connection with a remote device and setting parameters for data transfer, and a transfer execution step of starting data transfer after completion of the connection establishment step and continuing data transfer until a transfer error is recognized to have occurred, the transfer execution step comprising a synchronization establishment step of establishing character synchronization, and an ordinary transfer step of conducting ordinary data transfer after completion of the synchronization establishment step, wherein, when a transfer error is recognized to have occurred in the ordinary transfer step, execution proceeds to either the connection establishment step or the synchronization establishment step according to a time that has elapsed after the ordinary transfer step was started.

7. A data transfer method as claimed in claim 6, wherein, when a transfer error is recognized to have occurred in the transfer execution step, if a predetermined time has not elapsed after the transfer execution step was started, execution proceeds to the connection establishment step and, if the predetermined time has elapsed after the transfer execution step was started, execution proceeds to the synchronization establishment step.

8. A data transfer method as claimed in claim 6, wherein, when a transfer error is recognized to have occurred in the ordinary transfer step, if a predetermined time has not elapsed after the ordinary transfer step was started, execution proceeds to the connection establishment step and, if the predetermined time has elapsed after the ordinary transfer step was started, execution proceeds to the synchronization establishment step.

* * * * *